United States Patent
Mao et al.

(10) Patent No.: US 12,347,184 B2
(45) Date of Patent: Jul. 1, 2025

(54) METHOD AND APPARATUS FOR SUPPRESSING NOISE IN 3D ROAD SURFACE RECONSTRUCTION

(71) Applicant: Robert Bosch GmbH, Stuttgart (DE)

(72) Inventors: Anping Mao, Suzhou (CN); Andreas Wimmer, Suzhou (CN); Wei Liu, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 18/079,466

(22) Filed: Dec. 12, 2022

(65) Prior Publication Data

US 2023/0215163 A1    Jul. 6, 2023

(30) Foreign Application Priority Data

Dec. 30, 2021   (CN) .......................... 202111649074.4

(51) Int. Cl.
*G06V 10/44*    (2022.01)
*G06V 10/25*    (2022.01)
(Continued)

(52) U.S. Cl.
CPC ............ *G06V 10/993* (2022.01); *G06V 10/25* (2022.01); *G06V 10/44* (2022.01); *G06V 20/588* (2022.01)

(58) Field of Classification Search
CPC ...... G06V 10/993; G06V 10/25; G06V 10/44; G06V 20/588; G06V 10/30; G06T 7/73;
(Continued)

(56) References Cited

U.S. PATENT DOCUMENTS 6,549,642 B1 *   4/2003   Sakurai ................ G06V 10/457
                                              382/104
11,024,042 B2 *   6/2021   Akashi ...................... G06T 7/13
(Continued)

OTHER PUBLICATIONS

Xiong et al., "A 3D Estimation of Strcutural Road Surface Based on Lane-Line Information," IFAC Papers Online, 51, No. 31, (2018), pp. 778-783.
(Continued)

*Primary Examiner* — Hadi Akhavannik
*Assistant Examiner* — Dion J Satcher
(74) *Attorney, Agent, or Firm* — Maginot, Moore & Beck LLP

(57) ABSTRACT

The present disclosure provides a method, apparatus and computer program product for suppressing noise in 3D road surface reconstruction. The method includes: acquiring an image related to a road surface; extracting horizontal line information and ROI (region of interest) information from the image, wherein the horizontal line information comprises a horizontal line pixel value, and the ROI information is used to perform 3D road surface reconstruction for the road surface; judging whether the difference between the horizontal line pixel value and a preset horizontal line pixel value is greater than a pixel threshold; judging whether the horizontal line pixel value is greater than a compensation threshold when the difference is greater than the pixel threshold; determining a compensation value based on the difference when the horizontal line pixel value is not greater than the compensation threshold; and adjusting the ROI information based on the compensation value.

11 Claims, 6 Drawing Sheets

(51) Int. Cl.
*G06V 10/98* (2022.01)
*G06V 20/56* (2022.01)

(58) Field of Classification Search
CPC . G06T 2207/30256; G06T 17/05; G06T 5/30; G06T 5/90; G06T 7/90; G06T 2207/20004
See application file for complete search history.

(56) References Cited

U.S. PATENT DOCUMENTS

| | | | |
|---|---|---|---|
| 2010/0054538 A1* | 3/2010 | Boon | G06T 7/246 382/104 |
| 2010/0188507 A1 | 7/2010 | Kageyama et al. | |
| 2013/0156337 A1* | 6/2013 | Kwon | G06V 20/56 382/264 |
| 2016/0350603 A1* | 12/2016 | Suddamalla | G06T 7/13 |

OTHER PUBLICATIONS

Park et al., "Robust Range Estimation with a Monocular Camera for Vision-Based Forward Collision Warning System", The Scientific World Journal 2014 (2014), 923632, 9 pages.

* cited by examiner

100

110

400

500

600

METHOD AND APPARATUS FOR SUPPRESSING NOISE IN 3D ROAD SURFACE RECONSTRUCTION

This application claims priority under 35 U.S.C. § 119 to patent application no. CN 202111649074.4, filed on Dec. 30, 2021 in China, the disclosure of which is incorporated herein by reference in its entirety.

The present disclosure relates to the field of autonomous driving, in particular to a method and apparatus for suppressing noise in 3D road surface reconstruction.

BACKGROUND

In the field of autonomous driving, lane marking detection is an important function, which depends on a combination of pixel detection and road surface estimation. In multi-target camera products, a conventional computer vision method is generally used for lane marking detection on main roads; in most operating conditions, lane marking pixel inspection can be satisfied, whereas there is generally considerable noise in the process of road surface estimation. In a conventional computer vision method, a large amount of structural geometric information can be used to reduce the amount of computation; this structural geometric information may include for example a sky view, a left-side street view, a right-side street view, a drivable lane view, a left-side road edge view, a right-side road edge view, etc.

In the document "A 3D Estimation of Structural Road Surface Based on Lane-Line Information", a method for performing 3D estimation of a structural road surface based on lane line information is presented, wherein the Hough transform and the method of least squares (LSM) are applied to close-range and long-range lane marking lines, then an attempt is made to reconstruct a 3D road surface according to pseudo point cloud data of the road surface. However, such a method involves a large amount of convolutional computation and fitting in edge detection, and is thus inefficient for limited embedded systems.

In the document "Robust Range Estimation with a Monocular Camera for Vision-Based Forward Collision Warning System", a range estimation method for using a monocular camera for a vision-based forward collision warning system is proposed. In said document, a horizontal line is used in the proposed range estimation method for tracking objects.

In US patent application US20100188507A1, a lane line marking detection apparatus and a lane line marking detection method are proposed, wherein colour clustering, brightness clustering and similar methods are widely used for lane line marking detection in some typical situations.

However, in many operating conditions, there is considerable noise in road surface estimation for lane marking detection, and consequently the reconstructed 3D road surface is not good enough; thus, some lane marking outputs are curved inwards, while some lane marking outputs are curved outwards, resulting in a large error in the process of lane marking detection.

Thus, it is hoped that an improved technical solution can be provided to solve the abovementioned problem in the prior art.

SUMMARY

In response to the above problem, the aim of the present application is to propose a method and apparatus for suppressing noise in 3D road surface reconstruction, and a computer program product; horizontal line detection and lane marking detection are combined to improve road surface estimation and compensation during 3D road surface reconstruction, in order to increase the lane line output stability.

According to one aspect of the present application, a method for suppressing noise in 3D road surface reconstruction is provided, comprising: acquiring an image related to a road surface; extracting horizontal line information and ROI (region of interest) information from the image, wherein the horizontal line information comprises a horizontal line pixel value, and the ROI information is used to perform 3D road surface reconstruction for the road surface; judging whether the difference between the horizontal line pixel value and a preset horizontal line pixel value is greater than a pixel threshold; judging whether the horizontal line pixel value is greater than a compensation threshold when the difference is greater than the pixel threshold; determining a compensation value based on the difference when the horizontal line pixel value is not greater than the compensation threshold; and adjusting the ROI information based on the compensation value.

According to another aspect of the present application, an apparatus for suppressing noise in 3D road surface reconstruction is provided, comprising: an acquisition module, for acquiring an image related to a road surface; an extraction module, for extracting horizontal line information and ROI (region of interest) information from the image, wherein the horizontal line information comprises a horizontal line pixel value, and the ROI information is used to perform 3D road surface reconstruction for the road surface; a first judgement module, for judging whether the difference between the horizontal line pixel value and a preset horizontal line pixel value is greater than a pixel threshold; a second judgement module, for judging whether the horizontal line pixel value is greater than a compensation threshold when the difference is greater than the pixel threshold; a determining module, for determining a compensation value based on the difference when the horizontal line pixel value is not greater than the compensation threshold; and an adjustment module, for adjusting the ROI information based on the compensation value.

The present application also provides an apparatus for suppressing noise in 3D road surface reconstruction. The apparatus comprises: at least one processor; and a memory, storing computer-executable instructions which, when executed, cause the at least one processor to perform the method for suppressing noise in 3D road surface reconstruction as described above.

The present application also provides a computer program product for suppressing noise in 3D road surface reconstruction. The computer program product comprises a computer program which is run by at least one processor to perform the method for suppressing noise in 3D road surface reconstruction as described above.

In the process of 3D road surface reconstruction, by performing compensation or calibration of deviation in horizontal line information in advance before analysing ROI information, and calibrating the ROI information based on the calibrated horizontal line information, road surface estimation noise or errors in the process of 3D road surface reconstruction can be reduced or suppressed heuristically, and a more accurate 3D road surface can thereby be provided.

BRIEF DESCRIPTION OF THE DRAWINGS

A more comprehensive understanding of the abovementioned and other aspects of the present application can be gained from the detailed explanation below in conjunction with the following drawings. It must be pointed out that the scales of different drawings might be different for the sake of clear illustration, but this will not affect understanding of the present application. In the drawings.

DETAILED DESCRIPTION

The content of the present disclosure is now discussed with reference to several exemplary embodiments. It should be understood that the discussion of these embodiments is merely intended to enable those skilled in the art to better understand and thereby implement embodiments of the content of the present disclosure, not to teach any limitation of the scope of the content of the present disclosure.

Various embodiments of the content of the present disclosure are described in detail below with reference to the drawings.

Figure 1A:
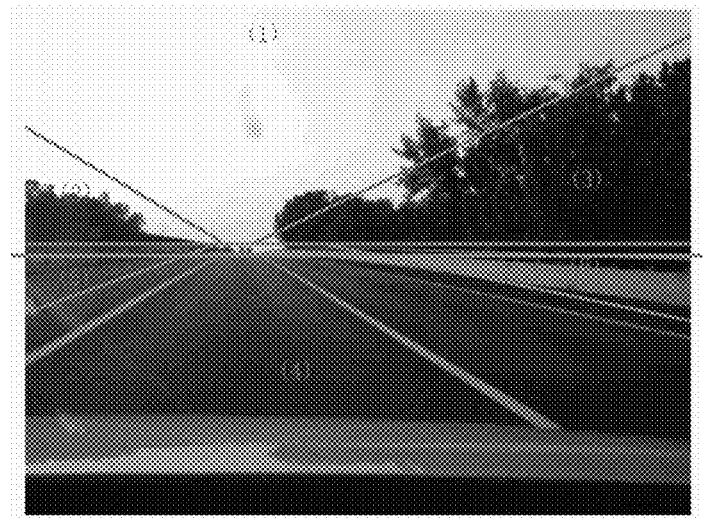
FIG. 1A shows an exemplary image containing road surface geometric structural information used in an existing 3D road surface reconstruction method.

FIG. 1A shows an exemplary image 100 containing road surface geometric structural information used in an existing 3D road surface reconstruction method. As shown in FIG. 1A, the image 100 is divided into five regions, each of which may be regarded as a region of interest (ROI) for 3D road surface reconstruction. In the current method, geometric structural information in these five regions may be used to perform 3D road surface reconstruction. For example, a first region (1) in the image 100 may be a sky view, a second region (2) may be a left-side street view, a third region (3) may be a right-side street view, a fourth region (4) may be a drivable lane view, a fifth region (5) may be a left-side road edge view, and a sixth region (6) may be a right-side road edge view.

Figure 1B:
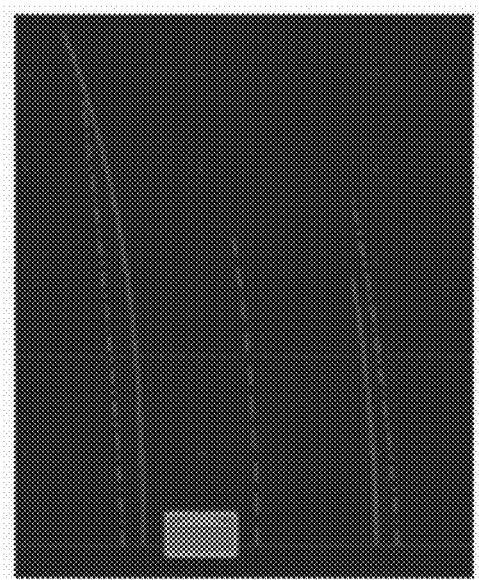
FIG. 1B shows a comparative picture of an exemplary road surface marking error situation caused by road surface estimation noise in an existing 3D road surface reconstruction method.

However, when a vehicle is driving on a road with an upward slope, a downward slope, a connecting line or bumps, there will be errors in road surface marking estimation because the reference height (e.g. the height of a horizontal line) might be different each time a road-related image is captured, thus affecting a post-processing stage in the process of 3D road surface reconstruction. FIG. 1B shows a comparative picture 110 of an exemplary road surface marking error situation caused by road surface estimation noise in an existing 3D road surface reconstruction method in the circumstances mentioned above.

As the comparative picture 110 in FIG. 1B shows, when a vehicle is driving on a road with an upward slope, road surface markings simulated by the existing 3D road surface reconstruction method (the markings indicated by the dotted lines in FIG. 1B) deviate from the actual road surface markings (the markings indicated by the solid lines in FIG. 1B).

To solve the abovementioned problem of road surface marking deviation which exists when a vehicle is driving on a road with an upward slope, a downward slope, a connecting line or bumps, the content of the present disclosure proposes an improved method for suppressing noise in 3D road surface reconstruction. The method incorporates horizontal line calibration in the process of 3D road surface reconstruction, performing compensation or calibration of deviation in horizontal line information in advance before analysis of ROI information to obtain compensated horizontal line pixel values, and providing the compensated horizontal line pixel values to the 3D road surface reconstruction process to calibrate or adjust ROI information for 3D road surface reconstruction, thereby heuristically reducing road surface estimation errors in the 3D road surface reconstruction process based on the horizontal line information.

Figure 2:
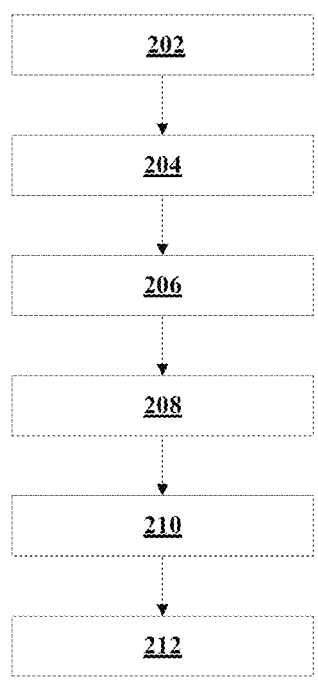
FIG. 2 shows a flow chart of an exemplary method for suppressing noise in 3D road surface reconstruction according to an embodiment of the present disclosure.

FIG. 2 shows a flow chart 200 of an exemplary method for suppressing noise in 3D road surface reconstruction according to an embodiment of the present disclosure.

In operation 202, an image related to a road surface (e.g. a road surface of the lane in which the vehicle is located and/or a neighbouring lane) is acquired. In some examples, a built-in camera of the vehicle (e.g. a multi-target camera), or a camera disposed at any position where an image related to the road surface can be captured, may be used to acquire an image related to the road surface.

In operation 204, horizontal line information and ROI information are extracted from the acquired image, wherein the ROI information may comprise information relating to any region used to perform 3D road surface reconstruction. In one example, the horizontal line information may comprise horizontal line pixel values associated with the horizontal line. In this example, the extraction of horizontal line information may be performed in the following way, but is not limited thereto: the acquired image is divided into multiple rows; for each row, a pixel value of the row is computed, wherein the pixel value of each row is obtained by adding together pixel values of all points in the row; the pixel values of all rows are compared to determine a target row with the highest pixel value; the target row is identified as a horizontal line and information relating to the target row is identified as horizontal line information, wherein the pixel value of the target row is identified as a horizontal line pixel value.

For example, the horizontal line pixel value may be expressed as a vector Vi for a horizontal line (e.g. target row) i and computed as the sum of the pixel values (e.g. brightness values) of each of the points on the horizontal line via the following formula:

$$V_i = \sum_{i,0}^{i,w} B(i, j)$$

where B(i,j) denotes the pixel value of point (i,j) on the horizontal line, and w denotes the total number of points on the horizontal line i.

In some examples, the ROI information may comprise information (e.g. pixel values) for five regions of interest as shown in FIG. 1A. It must be understood that the ROI information is not limited to the information of the exemplary five regions of interest shown; in practice, any number of regions of interest may be set as required, or regions of interest may be partitioned on an image in any way.

In operation 206, a judgement is made as to whether the difference between the computed horizontal line pixel value and a preset horizontal line pixel value is greater than a pixel threshold, wherein the pixel threshold is set in advance. As an example, suppose that the computed horizontal line pixel value (e.g. the sum of brightness values of each of the points on the horizontal line) is 3560, the preset horizontal line pixel value is 3500, and the pixel threshold is 50; then the difference 60 between the computed horizontal line pixel value and the preset horizontal line pixel value is greater than the pixel threshold 50.

In operation 208, when the difference between the computed horizontal line pixel value and the preset horizontal line pixel value is greater than the pixel threshold, a judgement is made as to whether the horizontal line pixel value is greater than a compensation threshold, wherein the compensation threshold is set in advance. In some examples, when the difference is not greater than the pixel threshold, 3D road surface reconstruction for the road surface is performed based on the extracted ROI information.

In operation 210, when the horizontal line pixel value is not greater than the compensation threshold, a compensation value is determined based on the difference between the computed horizontal line pixel value and the preset horizontal line pixel value. As an example, the compensation value may be determined as being equal to the difference, or the compensation value may be determined as any value between the difference and the pixel threshold, etc. In some examples, when the horizontal line pixel value is greater than the compensation threshold, the acquired image is discarded.

In operation 212, the extracted ROI information may be adjusted based on the determined compensation value. For example, a pixel value of a ROI may be adjusted based on the determined compensation value. In some examples, the adjustment of ROI information may further comprise: obtaining a pixel value of a ROI from the ROI information, and applying the compensation value to the pixel value of the ROI to obtain a compensated pixel value of the ROI. In some examples, a judgement may be made as to whether to add the compensation value to the pixel value of the ROI or subtract the compensation value from the pixel value of the ROI, based on the relative sizes of the computed horizontal line pixel value and the preset horizontal line pixel value. As an example, when the computed horizontal line pixel value is greater than the preset horizontal line pixel value, the compensation value may be subtracted from the pixel value of the ROI to obtain the compensated pixel value of the ROI. In other examples, when the computed horizontal line pixel value is less than the preset horizontal line pixel value, the compensation value may be added to the pixel value of the ROI to obtain the compensated pixel value of the ROI.

It must be understood that the operations shown in the flow chart of the method 200 of FIG. 2 are merely exemplary; in other embodiments, one or more operations may be added to or removed from the method 200. For example, the method 200 may further comprise performing 3D road surface reconstruction based on the compensated pixel value of the ROI, etc.

Figure 3:
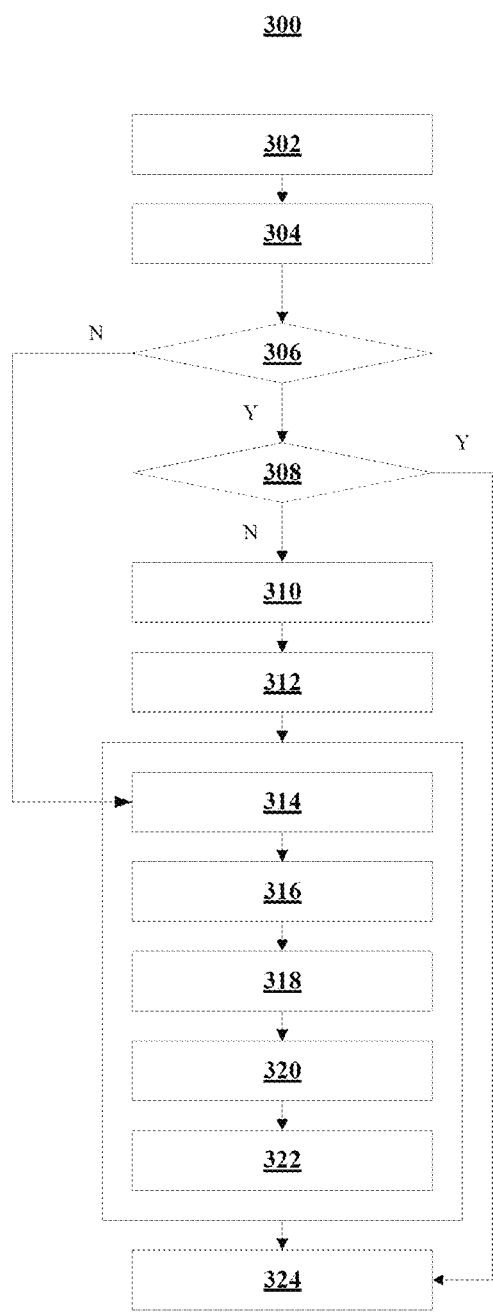
FIG. 3 shows a flow chart of another exemplary method for suppressing noise in 3D road surface reconstruction according to an embodiment of the present disclosure.

FIG. 3 shows a flow chart of another exemplary method 300 for suppressing noise in 3D road surface reconstruction according to an embodiment of the present disclosure.

In operation 302, an image related to a road surface is acquired; in operation 304, horizontal line information and ROI information are extracted from the image; in operation 306, a judgement is made as to whether the difference between a horizontal line pixel value in the horizontal line information and a preset horizontal line pixel value is greater than a pixel threshold, wherein the method 300 proceeds to operation 308 if the difference is greater than the pixel threshold (as shown by the "Y" for box 306 in FIG. 3); in operation 308, a judgement is made as to whether the horizontal line pixel value is greater than a compensation threshold, wherein the method proceeds to operation 310 if the horizontal line pixel value is not greater than the compensation threshold (as shown by the "N" for box 308 in FIG. 3); in operation 310, a compensation value is determined based on the difference; in operation 312, the ROI information is adjusted based on the compensation value. In the embodiments of the content of the present disclosure, the operations in boxes 302-312 above may be the same as or similar to operations 202-212 in FIG. 2.

Furthermore, in operation 306, if it is judged that the difference between the horizontal line pixel value and the preset horizontal line pixel value is not greater than a pixel threshold (as shown by the "N" for box 306 in FIG. 3), the method 300 proceeds to operation 314. In operation 314, a ROI in the acquired image may be selected.

In addition, in operation 308, if it is judged that the horizontal line pixel value is greater than the compensation threshold (as shown by the "Y" for box 308 in FIG. 3), the method 300 may proceed to operation 324, in which the 3D road surface reconstruction process is ended; for example, the method flow is ended by discarding the acquired image.

In operation 316, information of the ROI selected in operation 314 (e.g. an original pixel value or adjusted/compensated pixel value of the ROI) may be subjected to a convolution operation. In some examples, a convolution operation with a kernel of [[−2],[0],[2]] may be used. In some examples, a row deviation may be used to subject the image to a row-by-row subtraction operation to perform convolution, e.g. $C_{n,i} = M_{n,i} - M_{n-1,i}, \ldots, C_{n,0} = 0$, wherein $C_n$ denotes the convolution result for the nth line, and $M_n$ denotes the matrix representation of the nth line.

In operation 318, the convolution result of operation 316 may be quantified; in operation 320, the quantification result may be subjected to corrosion processing; in operation 322, image regions that have undergone corrosion processing are linked. In operation 324, the 3D road surface reconstruction method can be ended. It must be understood that any one or more of operations 314-322 may be implemented using any suitable existing corresponding image processing operation; thus, to avoid blurring the technical solution of the content of the present disclosure, no further detailed description of operations 314-322 is given here.

Figure 4:
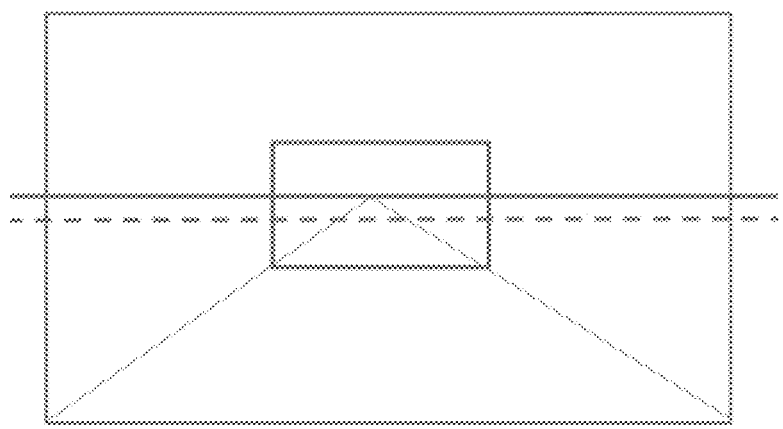
FIG. 4 shows a picture of an exemplary positional relationship between a true horizontal line and a logical horizontal line of a road surface according to an embodiment of the present disclosure.

FIG. 4 shows a picture 400 of an exemplary positional relationship between a true horizontal line and a logical horizontal line of a road surface according to an embodiment of the present disclosure.

As shown in FIG. 4, supposing that the dimensions of the acquired image are (W, H), wherein W denotes a width value of the image (shown as the horizontal axis direction in FIG. 4), and H denotes a height value of the image (shown as the vertical axis direction in FIG. 4). The height of a logical horizontal line (the horizontal line indicated by the solid line in FIG. 4) that is preset for the road surface may be set as $h_1$, and the width thereof may be set as $w_1$, wherein the height value and width value of the preset logical horizontal line may be preset fixed values.

In some examples, the height $h_1$ of the logical horizontal line may be set at one half of the image height, i.e. $h_1=½ H$, and the width of the logical horizontal line may be set as the width of the image, i.e. $w_1=W$. In other examples, the height $h_1$ of the logical horizontal line is set at any value between 0 and H, depending on the position where the camera is disposed. In some examples, when the height Y and width X of the true horizontal line of the road surface (the horizontal line indicated by the dotted line in FIG. 4) are within a certain range of the height and width of the logical horizontal line respectively, 3D road surface reconstruction may be performed based on ROI information in the image. As an example, when $$X \in \left[\frac{W}{2} - 100, \frac{W}{2} + 100\right]$$

and Y∈[H−80, H+80], 3D road surface reconstruction may be performed based on selected ROI information in the image; when $$X \notin \left[\frac{W}{2} - 100, \frac{W}{2} + 100\right]$$

and Y∉[Y−80, H+80], a compensation value may be determined based on information of the true horizontal line (e.g. a pixel value of the true horizontal line) and information of the logical horizontal line (e.g. a pixel value of the logical horizontal line), and the ROI information may be adjusted based on the compensation value, so as to perform 3D road surface reconstruction based on the adjusted ROI information.

It must be understood that all specific numbers given in the examples herein are exemplary and non-limiting, and the numbers given as examples do not limit the technical solution of the present disclosure in any way.

Figure 5:
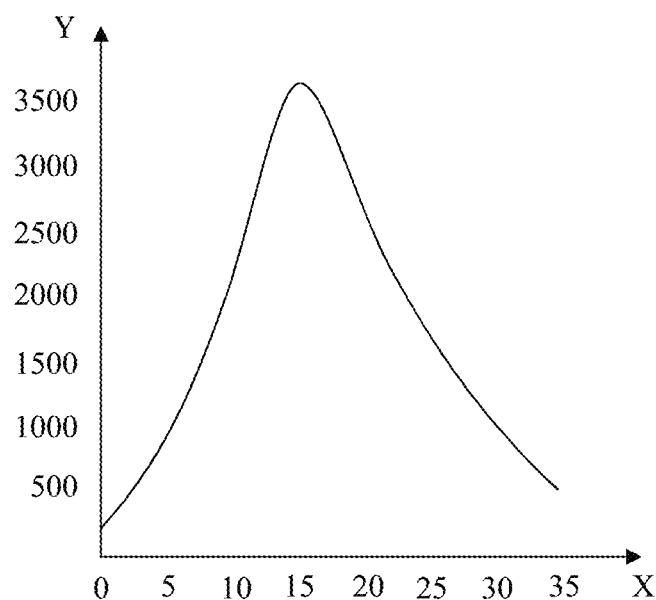
FIG. 5 shows an exemplary graph for determining the position of a horizontal line according to an embodiment of the present disclosure.

FIG. 5 shows an exemplary graph 500 for determining the position of a horizontal line according to an embodiment of the present disclosure. In the graph 500, the X axis represents the height of the ROI, and the Y axis represents the sum of brightness values. The height corresponding to the peak value on the Y axis (i.e. the point where the sum of brightness values is largest) may be determined as the height corresponding to the horizontal line, and it is thereby possible to determine the position of the horizontal line. It must be understood that although the graph 500 shown in FIG. 5 is a smooth curve, the curve may be a non-smooth curve in other exemplary figures.

Figure 6:
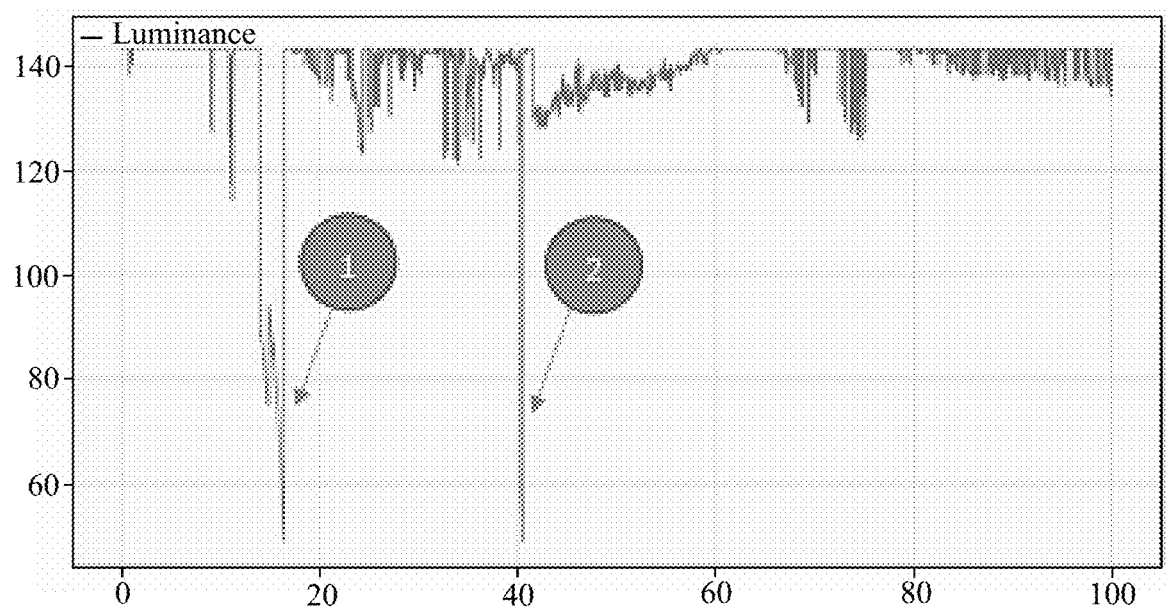
FIG. 6 shows an exemplary image comprising horizontal line information with noise according to an embodiment of the present disclosure.

FIG. 6 shows an exemplary image 600 comprising horizontal line information with noise according to an embodiment of the present disclosure. In FIG. 6, the X axis represents time, and the Y axis represents a brightness value of a horizontal line detected with time. A horizontal line in image 600 that has a brightness value greater than a predetermined value (e.g. compensation threshold) may be regarded as noise, e.g. brightness value 1 and brightness value 2 shown in image 600. In some examples, acquired images with brightness value 1 and brightness value 2 respectively may be taken to be noise images, which are discarded in the process of determining the horizontal line compensation value.

Figure 7:
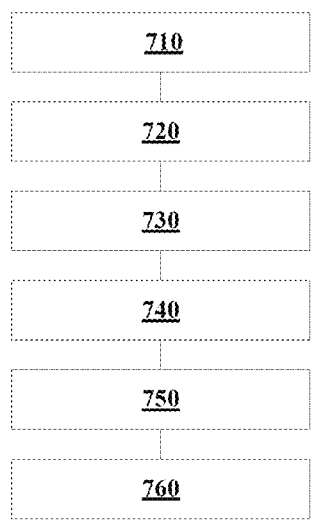
FIG. 7 shows an exemplary apparatus for suppressing noise in 3D road surface reconstruction according to an embodiment of the present disclosure.

FIG. 7 shows an exemplary apparatus 700 for suppressing noise in 3D road surface reconstruction according to an embodiment of the present disclosure. The apparatus 700 may comprise: an acquisition module 710, for acquiring an image related to a road surface; an extraction module 720, for extracting horizontal line information and ROI information from the image; wherein the horizontal line information comprises a horizontal line pixel value, and the ROI information is used to perform 3D road surface reconstruction for the road surface; and a first judgement module 730, for judging whether the difference between the horizontal line pixel value and a preset horizontal line pixel value is greater than a pixel threshold; a second judgement module 740, for judging whether the horizontal line pixel value is greater than a compensation threshold when the difference is greater than the pixel threshold; a determining module 750, for determining a compensation value based on the difference when the horizontal line pixel value is not greater than the compensation threshold; and an adjustment module 760, for adjusting the ROI information based on the compensation value. In addition, the apparatus 700 may further comprise any other module for suppressing noise in 3D road surface reconstruction according to embodiments of the content disclosed above.

Figure 8:
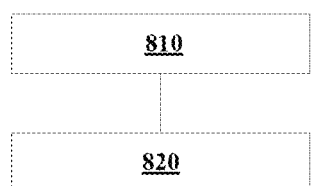
FIG. 8 shows another exemplary apparatus for suppressing noise in 3D road surface reconstruction according to an embodiment of the present disclosure.

FIG. 8 shows another exemplary apparatus 800 for suppressing noise in 3D road surface reconstruction according to an embodiment of the present disclosure. The apparatus 800 may comprise: at least one processor 810; and a memory 820 storing computer-executable instructions. The computer-executable instructions, when executed, can cause the at least one processor 810 to perform any operation of the method for suppressing noise in 3D road surface reconstruction as described above.

The embodiments of the present disclosure propose a computer program product for suppressing noise in 3D road surface reconstruction, comprising a computer program which is run by at least one processor to perform any operation of the method for suppressing noise in 3D road surface reconstruction as described above.

It should be understood that all of the modules in the apparatus described above may be implemented in various ways. These modules may be implemented as hardware, software, or a combination thereof. In addition, in terms of function, any of these modules can be further divided into sub-modules or combined.

Processors have been described in conjunction with various apparatuses and methods. These processors may be implemented using electronic hardware, computer software or any combination thereof. Whether these processors are implemented as hardware or software will depend on the specific application and the overall design constraints applied to the system. As an example, the processors set out in the present disclosure, any part of the processors, or any combination of the processors may be implemented as microprocessors, microcontrollers, digital signal processors (DSP), field programmable gate arrays (FPGA), programmable logic devices (PLD), state machines, gate logic, discrete hardware circuits, and other suitable processing components configured to perform various functions described in the present disclosure. The functions of the processors set out in the present disclosure, any part of the processors, or any combination of the processors may be implemented as software run by a microprocessor, microcontroller, DSP or other suitable platform.

Those skilled in the art should understand that various modifications and alterations can be made to the embodiments disclosed above without deviating from the substance of the disclosure; all such modifications and alterations should fall within the scope of protection of the present disclosure, and said scope should be defined by the claims.

What is claimed is:

1. A method for suppressing noise in 3D road surface reconstruction, comprising:
   acquiring an image related to a road surface;
   extracting horizontal line information and region of interest (ROI) information from the image, wherein the extracted horizontal line information comprises a horizontal line pixel value, and the ROI information is used to perform 3D road surface reconstruction for the road surface;
   determining a difference between the horizontal line pixel value and a preset horizontal line pixel value;
   determining that the difference is greater than a pixel threshold;
   determining that the horizontal line pixel value is not greater than a compensation threshold after determining that the difference is greater than the pixel threshold;
   determining a compensation value based on the difference after determining that the horizontal line pixel value is not greater than the compensation threshold; and
   adjusting the ROI information based on the compensation value.

2. The method according to claim 1, wherein adjusting the ROI information further comprises:
   obtaining a pixel value of a ROI from the ROI information; and
   applying the compensation value to the pixel value of the ROI to obtain a compensated pixel value of the ROI.

3. The method according to claim 2, further comprising:
   performing the 3D road surface reconstruction based on the compensated pixel value of the ROI.

4. The method according to claim 1, wherein extracting the horizontal line information comprises:
   dividing the image into multiple rows;
   for each of the multiple rows, computing a pixel value of each row, wherein the pixel value of each row is obtained by adding together pixel values of all points in the row;
   comparing the pixel values of all rows to determine a target row with the highest pixel value; and
   identifying the target row as a horizontal line and identifying information relating to the target row as the horizontal line information, wherein the pixel value of the target row is identified as the horizontal line pixel value.

5. The method according to claim 1, further comprising:
   determining that the difference is not greater than the pixel threshold; and
   performing the 3D road surface reconstruction based on the ROI information after determining that the difference is not greater than a pixel threshold.

6. The method according to claim 1, further comprising:
   determining that the horizontal line pixel value is greater than the compensation threshold; and
   discarding the image based on determining that the horizontal line pixel value is greater than the compensation threshold.

7. An apparatus for suppressing noise in 3D road surface reconstruction, comprising:
   an acquisition module configured to acquire an image related to a road surface;
   an extraction module configured to extract horizontal line information and region of interest (ROI) information from the image, wherein the horizontal line information comprises a horizontal line pixel value, and the ROI information is used to perform 3D road surface reconstruction for the road surface;
   a first judgement module configured to judge whether a difference between the horizontal line pixel value and a preset horizontal line pixel value is greater than a pixel threshold;
   a second judgement module configured to judge whether the horizontal line pixel value is greater than a compensation threshold when the difference is greater than the pixel threshold;
   a determining module configured to determine a compensation value based on the difference when the horizontal line pixel value is not greater than the compensation threshold; and
   an adjustment module configured to adjust the ROI information based on the compensation value.

8. The apparatus according to claim 7, wherein the adjustment module is further configured to:
   obtain a pixel value of a ROI from the ROI information; and
   apply the compensation value to the pixel value of the ROI to obtain a compensated pixel value of the ROI.

9. The apparatus according to claim 8, further comprising:
   a detection module configured to perform the 3D road surface reconstruction based on the compensated pixel value of the ROI.

10. The apparatus according to claim 7, wherein the extraction module is further configured to:
    divide the image into multiple rows;
    for each of the multiple rows, compute a pixel value of each row, wherein the pixel value of each row is obtained by adding together pixel values of all points in the row;
    compare the pixel values of all rows to determine a target row with the highest pixel value; and
    identify the target row as a horizontal line and identify information relating to the target row as the horizontal line information, wherein the pixel value of the target row is identified as the horizontal line pixel value.

11. An apparatus for suppressing noise in 3D road surface reconstruction, comprising:
    at least one processor; and
    a memory, storing computer-executable instructions which, when executed, cause the at least one processor to perform the method according to claim 1.

* * * * *